UNITED STATES PATENT OFFICE.

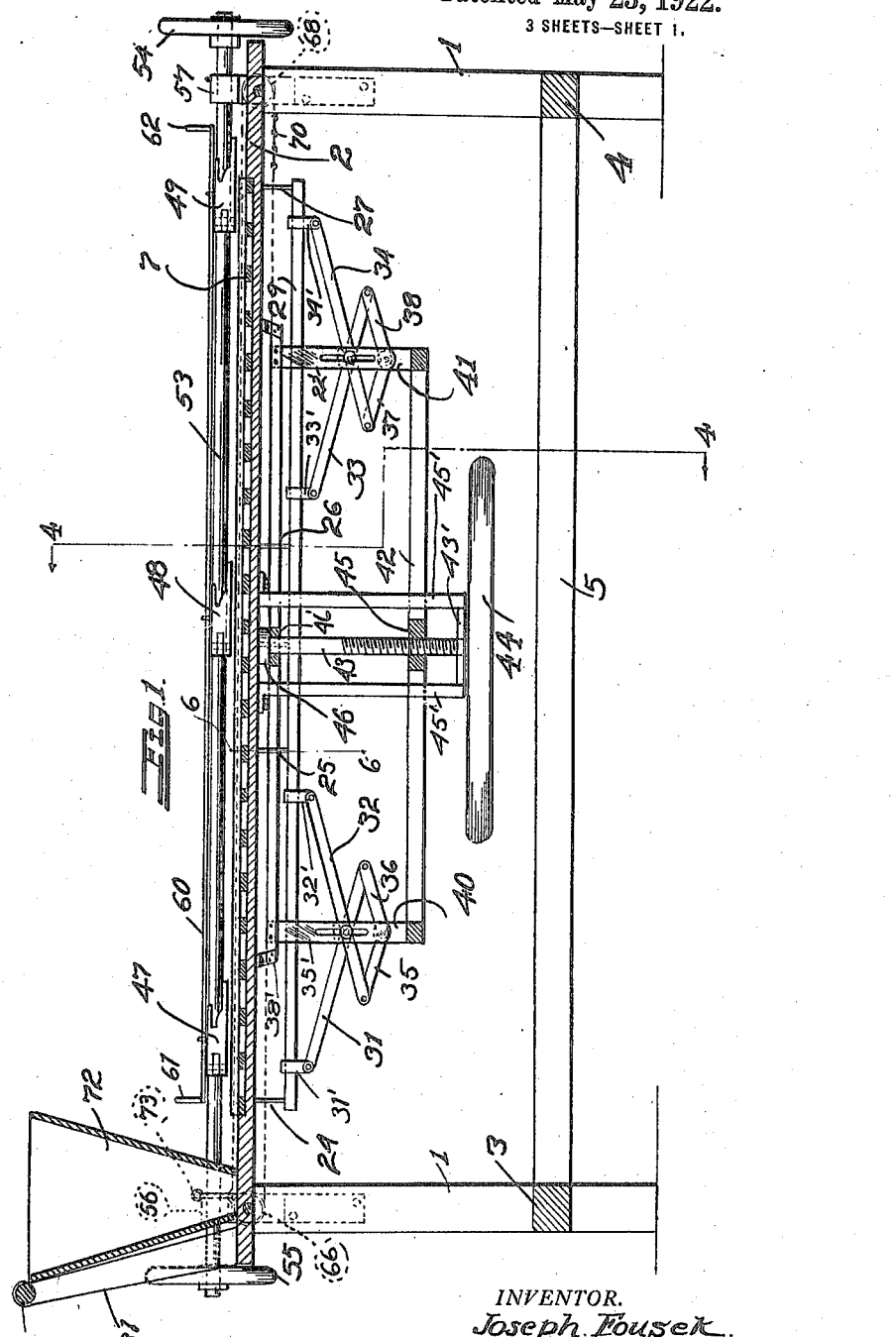

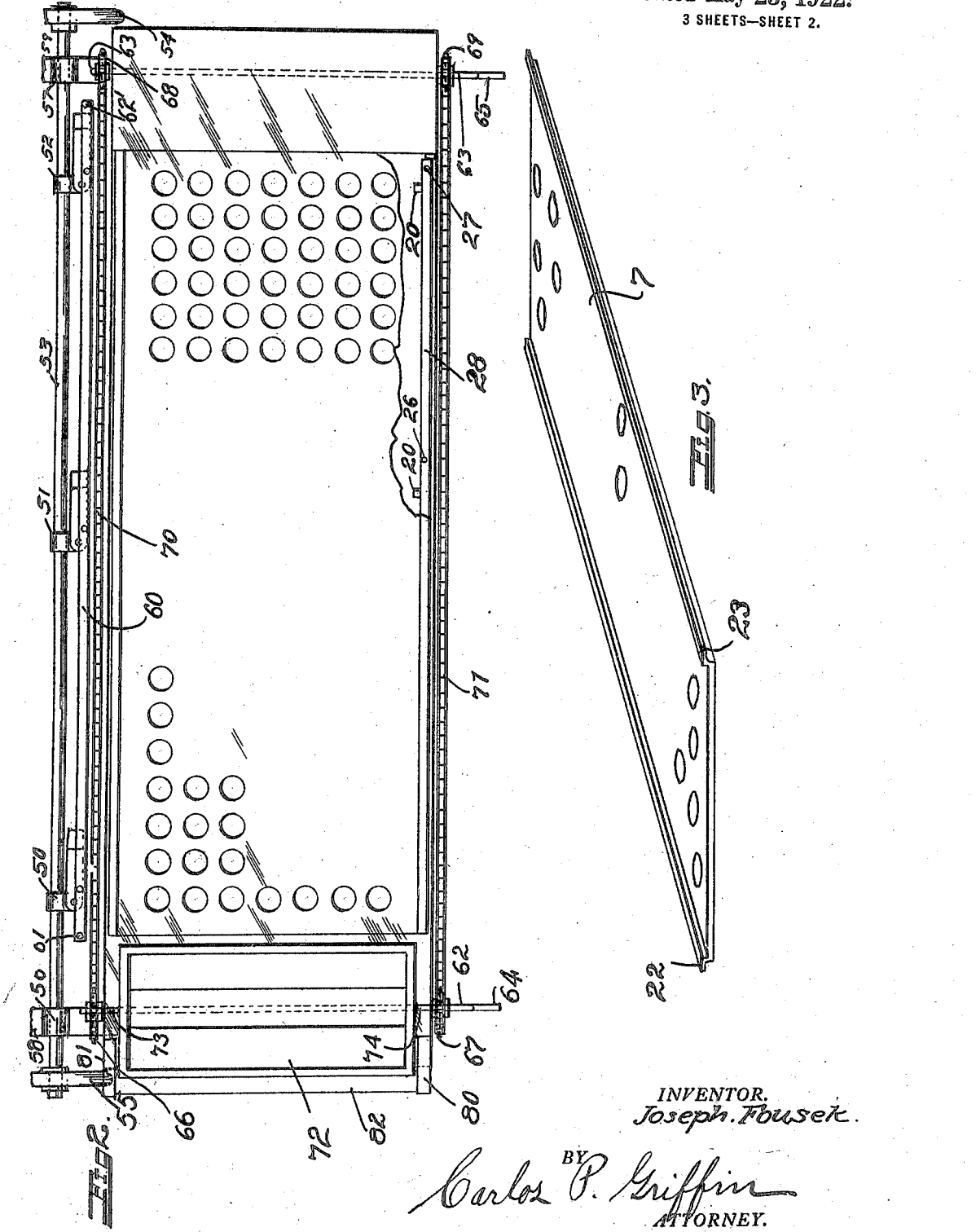

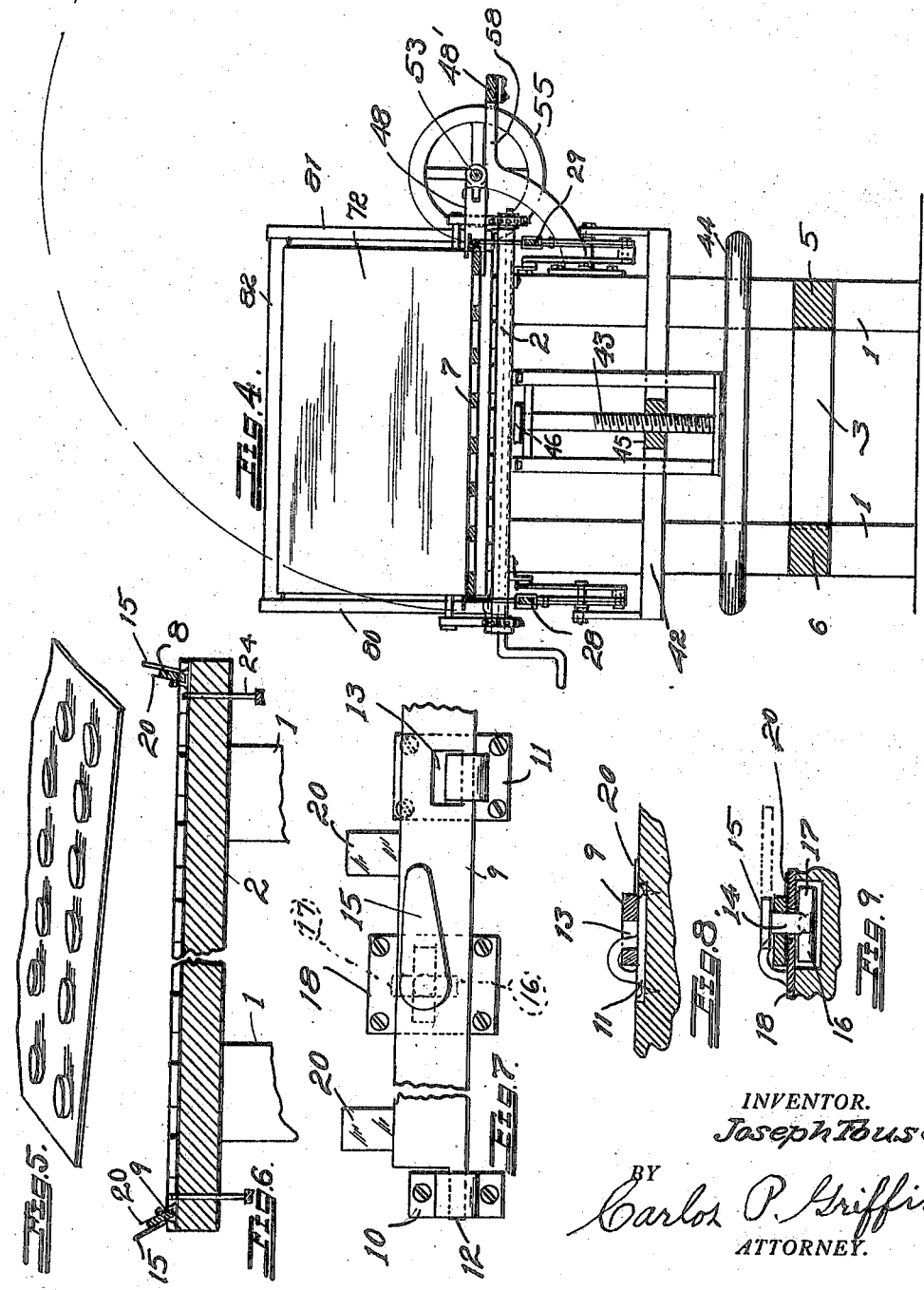

JOSEPH FOUSEK, OF SAN FRANCISCO, CALIFORNIA.

CAKE-FORMING MACHINE.

1,417,157. Specification of Letters Patent. Patented May 23, 1922.

Application filed November 11, 1920. Serial No. 423,394.

*To all whom it may concern:*

Be it known that I, JOSEPH FOUSEK, citizen of the Republic of Bohemia, residing at Grove and Laguna Sts., San Francisco, in the county of San Francisco, State of California, have invented a new and useful Cake-Forming Machine, of which the following is a specification in such full and clear terms as will enable those skilled in the art to construct and use the same.

This invention relates to a cake forming machine and its object is to produce a machine which will form a great number of small cakes upon a suitable carrier with minimum of hand labor.

It will be understood by those skilled in the art that small cakes such as macaroons and lady fingers are often formed by the use of some kind of a dropping apparatus which will drop small quantities of the cake dough upon pans or trays upon which pans or trays they are baked. Whether operated by hand or machine, such means of forming the cakes necessarily is limited to forming a few at a time or possibly only one as in the case of hand formed cakes, while with the present invention means is provided to form ten or twenty dozen cakes in one operation, the size of the apparatus depending upon the amount of work to be done.

Another object of the invention is to provide means whereby the die used for forming the cakes may be so positioned during the time the cakes are being removed from the machine as to be entirely free from having the dough at one portion of the die slide over on another portion of the die and thereby interfere with the placing of the next series of cakes.

Other objects of the invention will appear as the description proceeds.

An embodiment of the invention is shown in the accompanying drawings in which the same reference numeral is applied to the same portion throughout, but I am aware that there may be modifications thereof.

Figure 1 is a vertical longitudinal sectional view through the complete machine.

Fig. 2 is a plan view of the complete machine portions thereof being broken away for purposes of illustration.

Fig. 3 is a perspective view of the die as it appears removed from the machine.

Fig. 4 is a transverse sectional view of the machine, the plane of section being on line 4—4, Fig. 1.

Fig. 5 is a perspective view of one of the sheets carrying the cakes after they have been formed.

Fig. 6 is a sectional view illustrating the formation of the cakes upon the table, the plane of section being broken on the line 6—6, Fig. 1.

Fig. 7 is an enlarged plan view of one of the rails for holding the cake receiver in place.

Fig. 8 is a sectional view of one of the intermediate hinges for holding the cake receiving rails in place.

Fig. 9 is a vertical sectional view showing the latch for holding the cake receiver holding rails down.

The machine has four legs 1 at the corners, these legs are connected at the top by a suitable flat table 2 and they are braced near their lower portions by means of two end stringers 3 and 4 and two side stringers 5 and 6. The table 2 is recessed to receive the die plate 7, the top of the die place being level with the top of the ends of the table. Secured on the sides of the table are two longitudinally extending bars 8 and 9, these bars are carried by end hinges 10 and by a center hinge 11.

Each bar is provided with a lug 12 at each end to pass into the end hinges 10 and it has a slot 13 to provide a portion in line with the end lugs to pass through the loop in the hinges 11. Near the center of the bars 8 and 9 there is a revoluble pin 14, this pin has an operating handle 15 and lugs 16 and 17 on its other end which enable it to lock the bars 8 and 9 down against the table when said lugs have been passed through the slot in the plate 18, the latter being suitably secured to the table top. The bars 8 and 9 each have five thin projecting tongues as indicated at 20, said tongues being for the purpose of securing the paper in the proper position on the top of the table under the die plate.

The die plate has raised flanges 22 and 23 which fit over the rails 8 and 9 and afford the means for raising the die plate.

Just inside each side rail 8 and 9 there are vertically extending pins 24, 25, 26 and 27, four of which pins are supported by the longitudinally extending rails 28 and 29. Each of the bars 28 and 29 is supported by means of the lazy tongs illustrated in Fig. 1, which consists of four links 31 to 34 inclusive suitably pivoted to slides 31' to 34' inclusive and at their opposite ends to the ends of links 35 to 38 inclusive.

The links 35 to 38 inclusive are pivoted to depending slotted bars 35', 37', which latter bars are in turn supported from a horizontally extending bar 38' secured to the under side of the table.

There are two of the bars 38' and they are connected by means of a cross bar 46'. A horizontal frame 42 has upwardly extending supports 40, 41 at its corners, which supports extend to and are connected with the pivots connecting the bars 31, 32 and 33, 34. The bar 46' supports a screw 43, said screw having a head 46 resting upon the top of the bar 45. The screw also extends through a horizontal plate 43' connected to two depending arms 45', 45'', the object of which is to hold the screw in a fixed vertical position.

It will be understood from the construction just disclosed and which is duplicated at each side of the frame 42 that as the frame is raised the bars 31 to 34 inclusive will be raised and as the slides 31' to 34' inclusive move along the bars 28, 29 that the die plate will be raised when the pins 24 to 27 inclusive contact therewith.

When the die plate has been raised, it is turned completely over 180° by means of the arms 47 to 49 inclusive, these arms are shaped at one end to snugly fit the die plate and at the other end they are pivotally mounted on bosses 50 to 52 inclusive carried by the shaft 52. The shaft 53 has operating hand wheels 54—55 at its ends and it supports the die plate in its reversed horizontal position by means of a bar 48' carried by two bracket bearings 56 and 57. Adjacent the bosses 50—52 are two bracket supports 58—59 to hold the die plate in its reverse position.

The arms 47 to 49 inclusive are all pivotally connected with a longitudinally extending bar 50, said bar having operating handles 61, 62' at its ends, the object being to enable the workman to position the arms 47 to 49, when he is standing at either end of the machine.

Extending through the table at its ends are two transverse shafts 62, 63 said shafts having operating cranks 64, 65. These two shafts are also provided with sprocket wheels 66, 67 and 68, 69. A sprocket chain 70 passes around the sprocket wheels 66 and 68 and a sprocket chain 71 passes around the sprocket wheel 67 and 69.

A linked bottomless hopper 72 is placed upon a table at one end and it has lugs 73, 74 which are connected to the top run of the chains 70 and 71 so that as the chains are operated the hopper will be turned first in one direction and then in an opposite direction over the top of the die plate.

The operation of the apparatus is as follows:

The die plate may be placed upon the table in the position indicated in Fig. 2 and raised by the operation of the hand wheel 44 until it comes to the proper height to be engaged by the slotted ends of the arms 47 to 49 inclusive, whereupon the operator pulls or pushes upon the bar 60 and causes said arms to engage the die plate, thereupon the operator may turn the die plate upside down by the operation of the hand wheels 54, 55. This operation will place the die plate out of the way of the operator and leave him free to work at the machine, thereupon he will raise the bars 8, 9 to the position shown in Fig. 6 and will place one or more sheets of heavy paper on the top of the table in the depressed portion, said sheets being wide enough to be held in place by means of the tongues 20 on the bars 8 and 9.

When the sheets of paper have been placed in position the bars 8 and 9 will be turned down so that the tongues 20 will engage the paper, whereupon by the operation of the latch 14, one latch for each bar 8 and 9, the edges of the paper will be securely clamped to the table. Thereupon the die plate will be turned from its position at the back of the table to a position upon the top of paper sheets placed upon the table, that is, to the position shown in Fig. 2. Thereupon the dough is charged into the bottomless hopper 72, said hopper being of sufficient weight to prevent the dough from escaping at its bottom edges. The operator will then operate the cranks 64, or 65 at which ever end of the machine he may happen to be standing and will pull the hopper across the die plate.

This operation will cause the openings in the die plate to be filled with soft dough and the hopper is then pulled over on to the table at the end of the die plate. Thereupon the wheel 44 is operated to slowly and carefully raise the die plate from the soft mass of cake dough deposited on the paper sheet and it will be raised until it has been again restored to the level of the slides in the arms 47 to 49 inclusive, whereupon they will be turned to engage the die plate and the latter will be turned upside down at the back of the table.

It will be understood by those skilled in the art that it is necessary to turn the die plate exactly upside down, since if it is allowed to stand a few minutes at an incline, the inevitable small amount of dough which clings to it will slide down on one or the other of its faces and seriously interfere with the operation thereof.

When the die plate has been turned back out of the way, arms rest upon the two brackets 58, 59. The bars 8 and 9 are unlatched and raised and the mass of cakes upon the sheet of paper are transferred to the oven or to a suitable pan for baking.

It will be understood by those skilled in the art that while paper has been referred to as the receiving medium for the cakes for use under the die plate that any suitable material may be used for this purpose and it will also be understood that while the die plate has been shown with a plurality of circular openings therein, that the openings may equally well be of any other desired shape.

In order to provide for pouring the dough into the hopper 72 a pair of standards 80 and 81 support a rail 82 adjacent one end of the table. The receptacle containing the dough being rested upon the rail 82 when the hopper is charged.

What I claim is as follows, but various modifications may be made in the construction shown in the drawings and above particularly described form, within the purview of my invention.

1. A machine of the character described comprising a table, a die plate thereon, an open bottomed hopper, means to move the hopper along the die plate and means to vertically raise the die plate after the hopper has been moved over the same in one direction.

2. A machine of the character described comprising a table, means at the edge of the table to hold a dough receiving septum, a die plate placed over the dough receiving septum, an open bottomed hopper slidable along the table over the die plate, a table having portions at its ends to support the hopper independently of the die plate, means to raise the die plate vertically from the table and means to invert the die plate after it has been vertically raised.

3. A machine of the class described comprising a table, means at the sides of the table to hold a dough receiving septum, a die plate upon said septum, an open bottomed hopper slidable along the table over the die plate, the table having portions at its ends to support the hopper independently of the die plate and operating means on both ends of the table for moving the hopper along the table over the die plate.

4. A machine of the character described comprising a table, means at the sides of the table to hold the dough receiving septum thereon, a die plate upon the septum, an open bottomed hopper slidable along the table for the die plate, the table having portions at its ends for support of the said hopper independently of the die plate, means to raise the die plate vertically after the hopper has been moved over it once and a series of swinging arms adapted to engage the die plate for turning it upside down after it has been raised vertically from the dough receiving septum.

In testimony whereof I have hereunto set my hand this 30th day of October, A. D. 1920.

JOSEPH FOUSEK.